United States Patent [19]
Burr

[11] Patent Number: 6,049,402
[45] Date of Patent: Apr. 11, 2000

[54] MULTIPLEXED PHASE-CONJUGATE HOLOGRAPHIC DATA STORAGE USING A BUFFER HOLOGRAM

[75] Inventor: Geoffrey W. Burr, Cupertino, Calif.

[73] Assignee: International Business Machines Corporation, Armonk, N.Y.

[21] Appl. No.: 09/394,882

[22] Filed: Sep. 13, 1999

[51] Int. Cl.[7] ..................................................... G03H 1/26
[52] U.S. Cl. ............................... 359/22; 359/11; 359/15; 359/300
[58] Field of Search ................................. 359/22, 12, 11, 359/15, 300; 365/125

[56] References Cited

U.S. PATENT DOCUMENTS 5,793,504   8/1998   Stoll ........................................... 359/11

Primary Examiner—Cassandra Spyrou
Assistant Examiner—Craig Curtis
Attorney, Agent, or Firm—Banner & Witcoff, Ltd.; Thomas R. Berthold

[57] ABSTRACT

An optical storage system, which includes a temporary buffer and an optical storage medium, allows the practical combination of phase-conjugation and hologram multiplexing. The temporary buffer receives an object light beam and a first reference light beam, and records a first hologram at an intersection of the object light beam and the first reference light beam. The temporary buffer then receives a second reference light beam that is phase-conjugate to the first reference light beam and that illuminates the first hologram, thereby generating a phase-conjugate object light beam. The optical storage medium receives the phase-conjugate object light beam and a third multiplexed reference light beam, and records a second hologram for long-term storage at an intersection of the phase-conjugate object light beam and the third reference light beam.

50 Claims, 5 Drawing Sheets

MULTIPLEXED PHASE-CONJUGATE HOLOGRAPHIC DATA STORAGE USING A BUFFER HOLOGRAM

BACKGROUND OF THE INVENTION

1. Field of the Invention

The present invention relates to the field of optical memories. More particularly, the present invention relates to a system and a method for recording a hologram in an optical memory.

2. Description of the Related Art

Volume holographic data storage has recently received much interest because such storage provides both high storage density and fast readout speed. Each hologram stores thousands of bits of data that are encoded as 2-D data pages of bright and dark pixels. In order to retrieve the stored data pages with low a bit-error-rate (BER), the pages must be carefully imaged from an input pixel array or spatial light modulator (SLM), through a small volume of the holographic storage material, and onto an output pixel array, such as a CCD detector. This requires a short focal-length lens system that is corrected for all aberrations (particularly distortion) over a large field, as well as a storage material having a high optical quality.

A conventional approach for overcoming this problem is to use a phase-conjugate readout of volume holograms. See, for example, F. Ito et al., Opt. Lett. 17, 215, 1992; M. C. Bashaw et al., Opt. Lett. 18, 2059, 1993; F. Zhao et al., Opt. Lett. 21, 1295, 1995; and J. J. P. Drolet et al., Opt. Lett. 22, 552, 1997, each of which is incorporated by reference herein. After recording the object light beam from an SLM with a reference light beam, the hologram is reconstructed using a phase-conjugate (time-reversed copy) of the original reference light beam. The diffracted wavefront then retraces the path of the incoming object light beam, thereby canceling out any accumulated phase errors. Such an approach allows data pages having high fidelity to be retrieved from storage materials fabricated as multimode fibers or using a low-performance lens, or even using no lens for an extremely compact system.

A drawback to using a conventional phase-conjugate approach has been in the need for many multiplexed pairs of phase-conjugate reference light beams. If the phase-conjugate reference light beams are formed from two carefully-aligned counter-propagating beams, then any deviation from a plane wavefront or misalignment of wavevectors will be transferred to the reconstructed object light beam. For angle-multiplexing, both of the counter-propagating beams must also have beam-steering. A phase-conjugate mirror (PCM), using external pump beams, self-pumped, or seeded by backscattering, can be used for creating a true phase-conjugate reference light beam. For each new reference angle or wavelength, however, the system must wait while the PCM reflectivity builds up, decreasing either readout or recording speed. If the PCM is used during storage (because recording speed is perhaps less critical), there will also be a loss of dynamic range as the strong forward beam erases previous holograms.

What is needed is a phase-conjugate volume holographic storage system that uses the same multiplexed reference light beam for both recording and readout operations and that overcomes the problems associated with conventional phase-conjugate volume holographic storage systems.

SUMMARY OF THE INVENTION

The present invention provides a volume holographic storage system that stores a phase-conjugate object beam, but which uses the same multiplexed reference beam for both recording and readout operations.

The advantages of the present invention are provided by an optical storage system that includes a temporary buffer and an optical storage medium. Preferably, the optical storage medium contains a plurality of storage locations located along a longitudinal axis of the optical storage medium. An object light beam enters the optical storage medium through a crystal face that is perpendicular to the longitudinal axis and travels to the temporary buffer. The temporary buffer receives the object light beam and a first reference light beam, and records a first hologram at an intersection of the object light beam and the first reference light beam. A self-pumped phase-conjugate mirror receives the first reference light beam and generates a second reference light beam, which is phase-conjugate to the first reference light beam. Alternatively, an externally-pumped phase-conjugate mirror can receive the first reference light beam and generate the phase-conjugate second reference light beam. As another alternative, the second reference beam can be directed counter-propagating to the first beam, approximating phase-conjugation through careful alignment, taking care to make their respective wavefronts exactly opposite (two opposite plane waves, or one diverging and one converging beam having a common focus). The temporary buffer then receives the second reference light beam, thereby illuminating the first hologram and generating a phase-conjugate object light beam. The optical storage medium receives the phase-conjugate object light beam and a third reference light beam, and records a second hologram at an intersection of the phase-conjugate object light beam and the third reference light beam. Preferably, the first and second reference light beams are non-multiplexed light beams, the third reference light beam is a multiplexed light beam, and the second hologram is recorded at a selected storage location of the plurality of storage locations in the optical storage medium.

According to the invention, the optical storage media is formed from a photorefractive crystal, such as a $LiNbO_3$ crystal, a photorefractive polymer, or an organic read-write recording medium, such as bacteriorhodopsin. Moreover, the temporary buffer can be part of, or can be separate from the optical storage medium. Additionally, the optical storage media can be a rotating disk of optical storage media.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a volume holographic storage system that uses a two-step recording process. First, an intermediate temporary-buffer hologram is written in a temporary buffer between a data-bearing object light beam and a non-multiplexed reference light beam. The intermediate hologram is then reconstructed using the phase-conjugate of the non-multiplexed reference light beam that was used for recording, thereby reconstructing a phase-conjugated object light beam. Only a single pair of phase-conjugate reference light beams are required. The phase-conjugate object light beam passes back along the original incoming path, where the phase-conjugate light object beam is recorded using a multiplexed reference beam. The intermediate hologram can then be overwritten, or erased and then overwritten, using an object light beam containing a new page of information, which can then be transferred using a phase-conjugate object light beam to a different storage location or to the same storage location using a different multiplexed reference light beam. For data recall, the phase-conjugate object light beam is reconstructed by the multiplexed reference light beam that was used for recording, thereby allowing use of the same beam steering methods that have been developed for non-phase-conjugate holograms.

The present invention combines the immunity to lens aberrations provided by phase-conjugate holography with the simplicity of using the same multiplexed light reference beam for both recording and readout operations. Preferably, a self-pumped phase-conjugate mirror formed from $BaTiO_3$ provides the pair of phase-conjugate reference beams. Alternatively, an externally-pumped phase-conjugate mirror illuminated by the non-multiplexed reference light beam can be used for generating the phase-conjugate reference light beam. As yet another alternative, two counter-propagating beams can be aligned to approximate a pair of phase-conjugate reference beams, taking care to make their respective wavefronts exactly opposite (two opposite plane waves, or one diverging and one converging beam having a common focus). For general use, a two-color, gated material is preferably used as a permanent storage media, and a fast, easily-erased storage material is preferably used as a temporary storage buffer. Additionally, the present invention can be used for a general holographic storage system, whether stationary read-write holographic materials or rotating write-once holographic storage materials.

Figure 1:
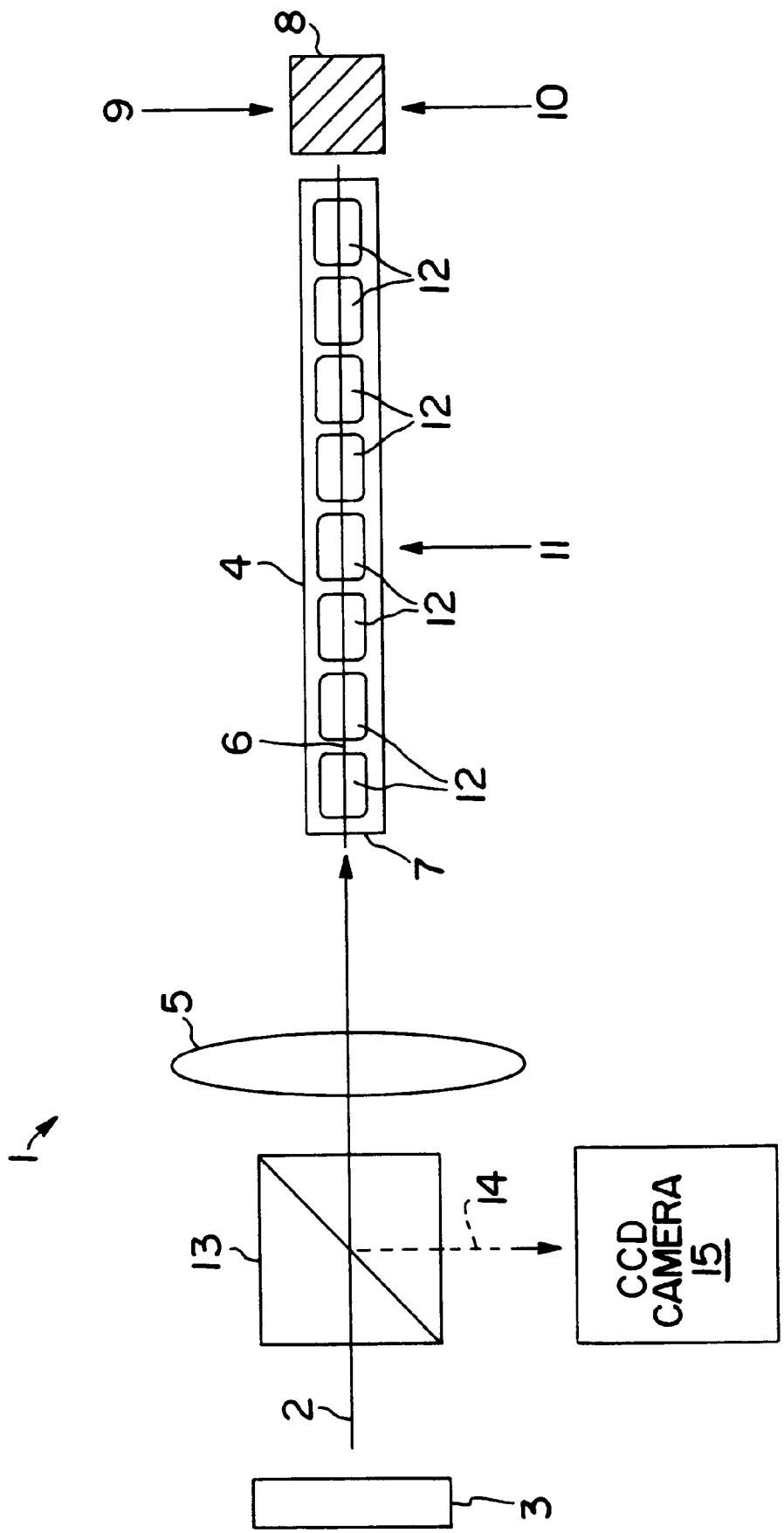
FIG. 1 shows a schematic diagram of an optical recording system according to the present invention.

FIG. 1 shows a schematic diagram of an optical recording system 1 according to the present invention. Initially, data that is to be recorded is modulated onto an object light beam 2 using a spatial light modulator (SLM) 3 and then focused into a long storage crystal 4 using a lens 5. Storage crystal 4 has a longitudinal axis 6 and a crystal face 7 that is perpendicular to longitudinal axis 6. Object light beam 2 enters storage crystal 4 through crystal face 7, travels down storage crystal 4 confined by total internal reflection, and enters a buffer storage material 8, where object beam 2 interferes with a non-multiplexed reference light beam 9 and records a hologram in buffer crystal 8.

The recorded hologram is then read using reference light beam 10 that is the phase-conjugate of beam 9, thereby reconstructing a phase-conjugate object beam that travels back into storage crystal 4 along longitudinal axis 6. The phase-conjugate object light beam is recorded in storage crystal 4 by interfering with a multiplexed reference light beam 11 that is applied to a selected one of a plurality of storage locations 12 located along longitudinal axis 6 in storage crystal 4. To readout the hologram recorded at a storage location 12, multiplexed reference light beam 11 is directed to the storage location of the recorded hologram, thereby generating an image of the recorded hologram that travels to a beamsplitter 13 and is directed to detector 15, such as a CCD camera, along return path 14. The configuration of FIG. 1 allows for the same angle- and spatial-multiplexing approaches that are used for conventional volume holograms.

Figure 2:
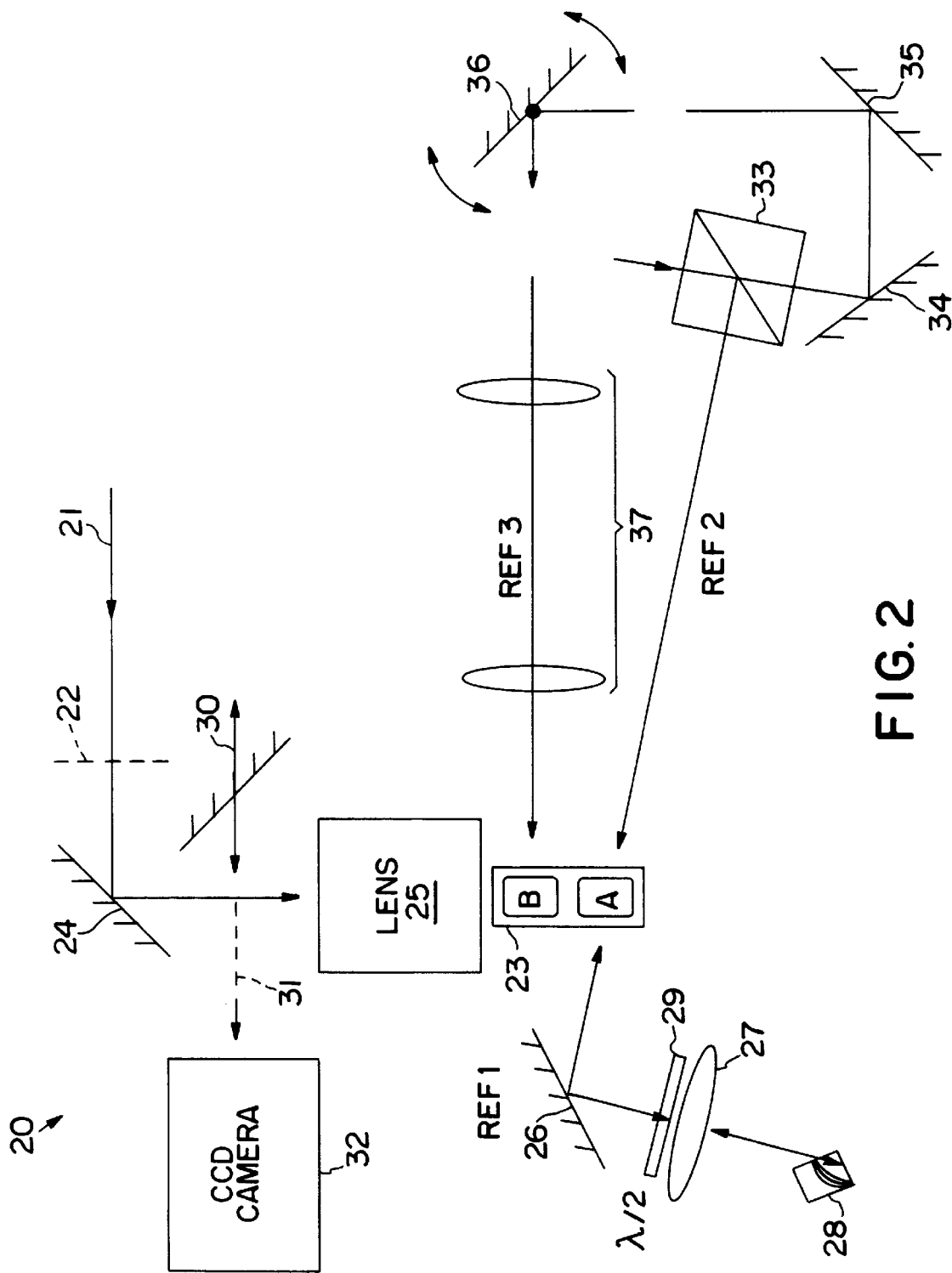
FIG. 2 shows a schematic diagram of an experimental apparatus that was used for demonstrating the two-step recording procedure of the present invention.

The two-step recording procedure of the present invention was performed using an experimental apparatus 20 that is depicted in FIG. 2. Not shown in FIG. 2 are an $Ar^+$ laser (514.5 nm), a polarizing beamsplitter used for separating the object and reference light beams, collimation optics for each of the object and reference light beams, an SLM, a zoom lens and custom 4-F optics that are part of a DEMON holographic demonstration platform. In the object light beam 21, a field of 320×240 pixels was demagnified between the SLM and an input image plane 22 by the zoom lens and the custom 4-F optics providing an image having an 18 micron pixel-to-pixel spacing. Object light beam 21 was then directed into a 0.02% Fe-doped single-color $LiNbO_3$ crystal 23 (8×15×15 $mm^3$, alpha ~0.8 $cm^{-1}$) by a mirror 24 and imaged by a f/1.4 Nikon camera lens 25 (f=50 mm) that was placed approximately 145 mm away. A second image plane of 5×3.8 $mm^2$ was formed at A in crystal 23 (no internal reflection) and contained 600 $\mu W$ of power for a typically half-ON encoded data page. The $LiNbO_3$ crystal 23 was cut for a 90 degree geometry (c-axis horizontal, at 45 degrees to the faces). An 8.5 mm diameter $Ref_2$ light beam was directed into crystal 23 at A to record an intermediate hologram.

A mirror 26 and a lens 27 (f=100 mm) was used to collect the $Ref_2$ light beam into a 2 mm diameter spot on a 5×6×8 $mm^3$ nominally-undoped $BaTiO_3$ crystal 28. The c-axis of $BaTiO_3$ crystal 28 was horizontal and parallel to a 6×8 $mm^2$ entrance face, creating the necessary conditions for a self-pumped phase conjugator mirror. $Ref_2$ was horizontally polarized (ordinary) at $LiNbO_3$ crystal 23, and vertically polarized (extraordinary) by a half-wave plate 29 at self-pumped PCM 28. The system was used with 70 mW in light beam $Ref_2$ before crystal 23 and 37 mW after.

The reflectivity of PCM 28 saturated at approximately 27% within 20–30 seconds, providing a phase-conjugate reference light $Ref_1$ of 10 mW. The orientation of the c-axis of $LiNbO_3$ crystal 23 (from lower left to upper right in FIG. 2) was roughly orthogonal to the grating vector between the $Ref_2$ and the object light beams, making the hologram between $Ref_1$ and the object light beam much stronger despite the 7:1 difference in incident power.

To prove that the experimental apparatus of FIG. 2 phase-conjugated the object light beam, a hologram was recorded using a phase distorter (a plastic lid from a small box that is not shown in FIG. 2) wedged between $LiNbO_3$ crystal 23 and Nikon lens 25. Beam $Ref_2$ was first directed through crystal 23 for approximately 1 minute to establish the phase-conjugate reference light beam $Ref_1$. Then, a data page was displayed on the SLM, imaged with the DEMON optics to intermediate image plane 22, and directed into $LiNbO_3$ crystal 23 as the object beam for 45 seconds.

After sliding a mirror 30 on the far side of Nikon lens 25 into the return path 32, the intermediate hologram recorded at A was reconstructed by $Ref_2$, and the data page detected pixel-to-pixel by a Pulnix TM6701AN CCD camera 32 (640×480 pixels on 9 micron centers, alternate rows and columns are ignored). The image was brought to focus and registered by moving CCD camera 32. Magnification (and rotation) were optimized upon system setup using the DEMON optics (and SLM rotation). Removing and replacing mirror 30 typically resulted in a misregistration of 5–10 CCD pixels.

Figure 3A:
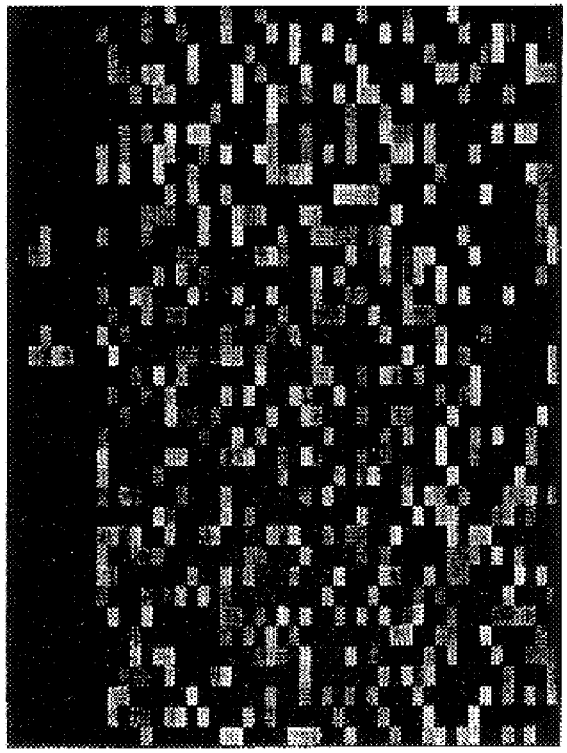
FIG. 3(a) shows a portion of the pixel-matched data page recorded and then reconstructed with high fidelity with a phase distorter in place using the experimental apparatus of FIG. 2.
Figure 3B:
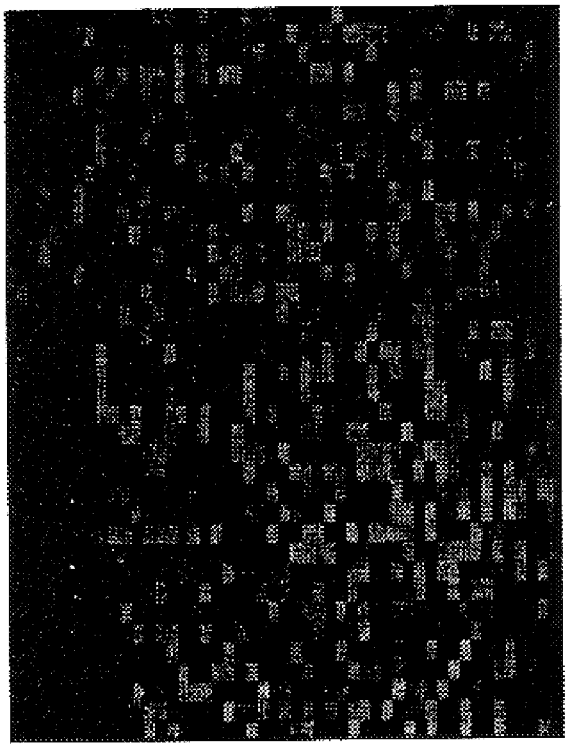
FIG. 3(b) shows the same portion of the data page when the same hologram is reconstructed without the phase distorter in place using the experimental apparatus of FIG. 2.
Figure 3C:
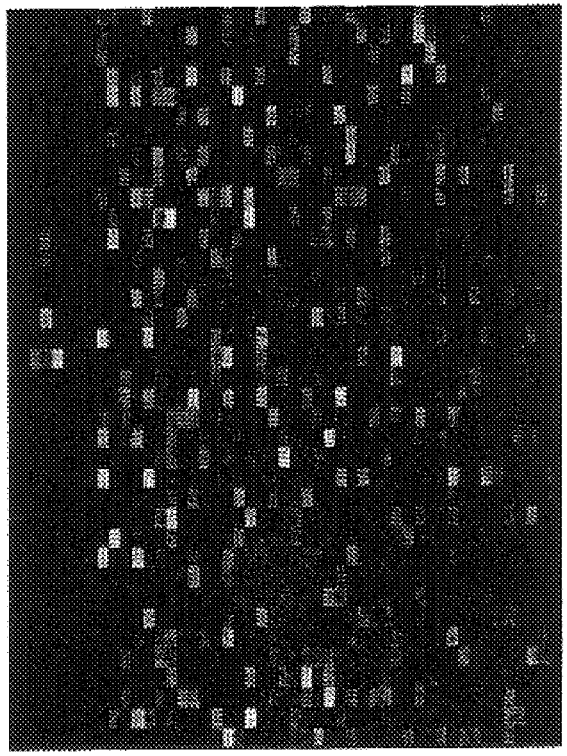
FIG. 3(c) shows the same portion of the data page when the same hologram is reconstructed with the phase distorter imperfectly replaced using the experimental apparatus of FIG. 2.
Figure 3D:
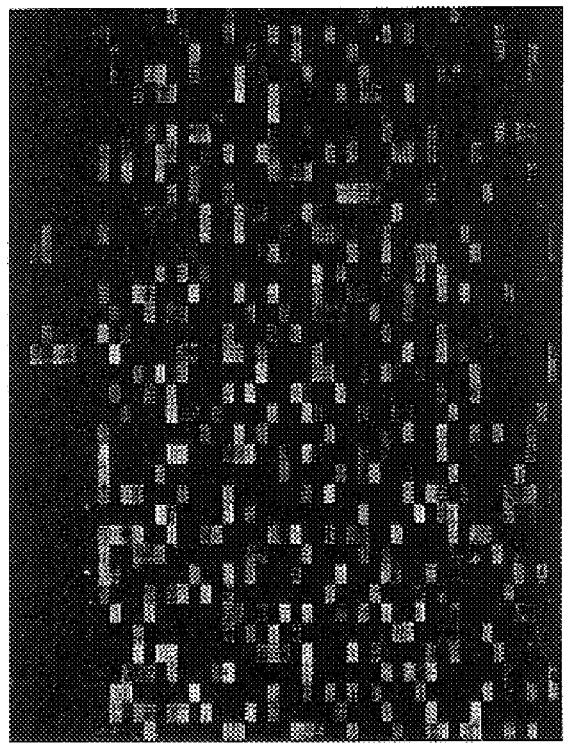
FIG. 3(d) shows a second hologram that was recorded and reconstructed without the phase distorter using the experimental apparatus of FIG. 2.

FIG. 3(a) shows a portion of the pixel-matched data page recorded and then reconstructed with high fidelity with the phase distorter in place using the experimental apparatus of FIG. 2. FIG. 3(b) shows the same portion of the data page when the same hologram is reconstructed without the phase distorter in place. In FIG. 3(c), the phase distorter was replaced (imperfectly), resulting in roughly the same optical path length between $LiNbO_3$ crystal and detector array, but a different phase distribution. The poor fidelity of FIG. 3(b) was partly due to the change in phase distortion (thickness variations of the plastic lid), and partly due to defocus (average thickness). Finally, in FIG. 3(d), a second hologram was recorded and reconstructed without the phase distorter, showing excellent fidelity again.

To implement the transfer of the phase-conjugated object wave into a multiplexed stack of holograms, a third light beam $Ref_3$ was directed into the front part of crystal 23. Light beam $Ref_3$ was formed by using a beam splitter 33, mirrors 34 and 35, and a galvo-mounted mirror 36. $Ref_3$, containing 82 mW, was deflected by galvo-mounted mirror 36 into a cylindrical 2:1 telescope 37, resulting in a narrowed elliptical beam. After recording the intermediate hologram at A using $Ref_1$ and the object beam for 45 seconds, both $Ref_2$ and $Ref_3$ illuminated the crystal for 45 seconds.

Figure 4A:
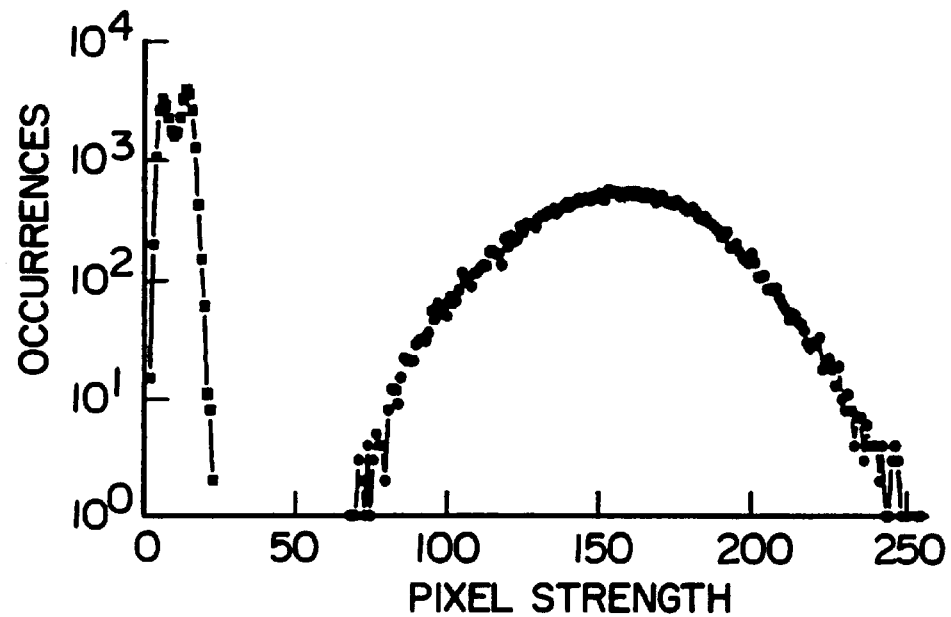
FIG. 4(a) shows a histogram of pixel values for a data page reconstructed from the buffer hologram of the experimental apparatus of FIG. 2.
Figure 4B:
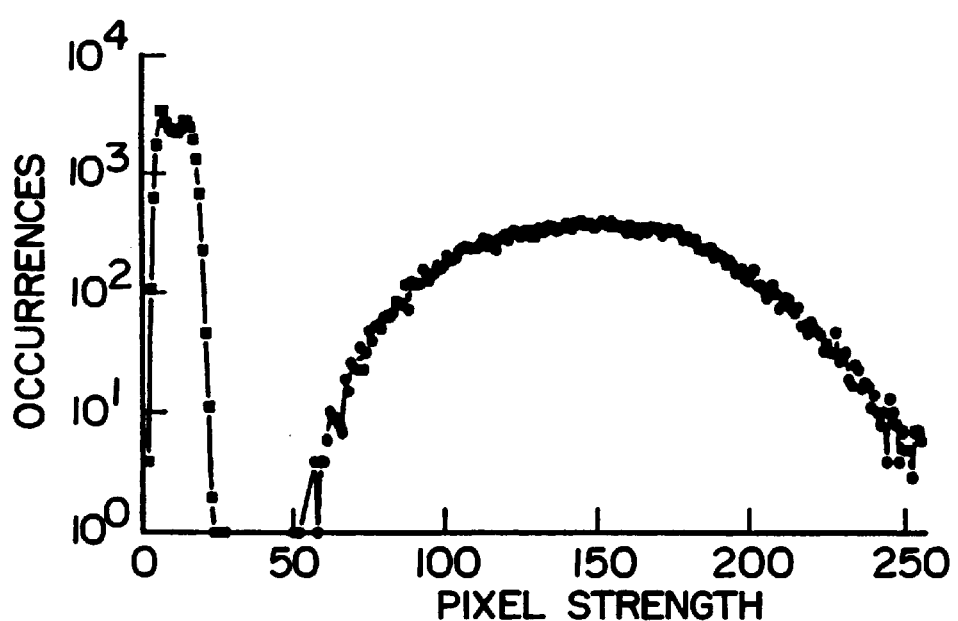
FIG. 4(b) shows a histogram of pixel values for the same data page of FIG. 4(a) after being transferred to the storage hologram of the experimental apparatus of FIG. 2.

FIG. 4(a) shows a histogram of pixel values for a data page reconstructed from the buffer hologram at A. The signal-to-noise ratio (SNR) for the histogram of FIG. 4(a) is 5.43 and the BER is $3.2 \times 10^{-20}$ ($\eta \sim 1.2 \times 10^{-5}$). FIG. 4(b) shows the same data page after being transferred into a storage hologram at B. The SNR for the histogram of FIG. 4(b) is 3.97 and the BER is $1.6 \times 10^{-17}$ ($\eta \sim 2.6 \times 10^{-6}$).

SNR is $$\frac{(\mu_{ON} - \mu_{OFF})}{\sqrt{\sigma_{ON}^2 + \sigma_{OFF}^2}},$$

where $\mu$ and $\sigma$ are respectively the mean and standard deviation of the ON and OFF pixels gathered across the whole data page. The BER is estimated assuming a 6-bits-from-8-pixels demodulation decoder and is thus dominated by local signal variations. Because the reconstructed object wave was diverging between the image plane at A and the storage hologram at B, the top and bottom of the transferred hologram tended to be dimmer than the center, reducing SNR. The similarity in extrapolated BER, however, indicates that local variations were small for both the intermediate and transferred holograms.

By changing the angle of $Ref_2$ and $Ref_3$, and by rebuilding phase-conjugate $Ref_1$, a second data page can be recorded into the buffer hologram at A and then transferred into a stack of stored holograms at B. Four different data pages were multiplexed in this way that were spaced by 0.02 degrees. As expected, when CCD camera 32 was re-registered to one of the four holograms, the other three holograms were also registered and accessible simply by rotating galvo mirror 36.

A single $LiNbO_3$:Fe crystal can be used for both the buffer and the storage hologram, although it is difficult to erase holograms in an $LiNbO_3$ crystal without using an appropriate combination of heat and time. Moreover, conventional single-color recording in a $LiNbO_3$ crystal provides some additional undesirable properties when implementing system 10 of FIG. 1. For example, such holograms erase during readout exposure, thus requiring a separate fixing operation. Absorption increases would speed recording, but limits the length of the storage crystal and, consequently, the number of storage locations. Both the volatility and absorption problems can be solved by using two-color, gated volume holography in $LiNbO_3$. The object and reference light beams use a long wavelength light, such as red or IR, that the crystal absorbs only in the presence of short wavelength gating light, such as green. The storage crystal can then be made extremely long with a gating light being used for activating storage locations and stored holograms read out without being erased.

The buffer hologram for the system 10 of FIG. 1 also requires a material having high sensitivity so that each new data page completely and rapidly overwrites a previous page. Dynamic range for multiple holograms, dark storage lifetime, hologram thickness, and optical quality, however, are less important and can be traded off during material optimization for more sensitivity, although low scattering and uniform spatial frequency response would still be required. There are several suitable read-write materials, such as photorefractive polymers and bacteriorhodopsin.

Because the technique of the present invention for multiplexed phase-conjugate holograms records two holograms for each stored data page, it would seem to inherently slow down a recording process. Nevertheless, once the diffraction efficiency of the buffer hologram exceeds the power efficiency of the original object light beam (typically <1%), then the recording of the storage hologram is actually accelerated. Additionally, by overwriting the previous contents of the buffer hologram using a new data page, neither the material nor its reference beams ever moves and the PCM only needs to adapt to slow alignment drifts. System recording speed, unaffected by PCM response, is limited only by the sensitivities of the buffer and storage holograms.

Alternatively, the two reference beams needed for the buffer hologram can be carefully aligned to be counter-propagating plane waves, thus approximating phase-conjugation. Other combinations of one diverging beam and one converging beam are also possible. This approach trades-off fidelity of the phase-conjugation for a higher efficiency in the buffer-hologram in comparison to the efficiency associated with the relatively low reflectivity of a phase-conjugate mirror.

Erasure of the buffer hologram is preferably externally induced, either using an electric field or an incoherent erase beam. Otherwise, sensitivities and dark decay must be tuned so that the buffer hologram erases rapidly in order to move on to the next page, but not so rapidly that the buffer hologram disappears while being transferred into the long-term storage hologram.

While the present invention has been described in connection with the illustrated embodiments, it will be appreciated and understood that modifications may be made without departing from the true spirit and scope of the invention.

What is claimed is:

1. An optical storage system, comprising:

a temporary buffer receiving an object light beam and a first reference light beam and recording a first hologram at an intersection of the object light beam and the first reference light beam, the temporary buffer further receiving a second reference light beam that is phase-conjugate to the first reference light beam, the second reference light beam illuminating the first hologram and thereby generating a phase-conjugate object light beam; and an optical storage medium receiving the phase-conjugate object light beam and a third reference light beam and recording a second hologram at an intersection of the phase-conjugate object light beam and the third reference light beam.

2. The optical storage system according to claim 1, wherein the first and second reference light beams are non-multiplexed reference light beams, the third reference light beam is a multiplexed reference light beam, the optical storage medium contains a plurality of storage locations, and the second hologram is recorded at a selected storage location of the plurality of storage locations in the optical storage medium.

3. The optical storage system according to claim 1, further comprising a self-pumped phase-conjugate mirror receiving the first reference light beam and generating the second reference light beam that is phase-conjugate to the first reference light beam.

4. The optical storage system according to claim 1, further comprising an externally-pumped phase-conjugate mirror receiving the first reference light beam and generating the phase-conjugate light beam.

5. The optical storage system according to claim 1, wherein the first and second reference light beams are counter-propagating.

6. The optical storage system according to claim 5, wherein one of the first and second reference light beams is a diverging beam and the other of the first and second reference light beams is a converging beam, and wherein the first and second reference light beams have a common focus point.

7. The optical storage system according to claim 1, wherein the optical storage media is formed from a photo-refractive crystal.

8. The optical storage system according to claim 7, wherein the photorefractive crystal is a LiNbO$_3$ crystal.

9. The optical storage system according to claim 7, wherein the object light beam and the reference light beam have a first wavelength, and wherein the photorefractive crystal receives a gating light having a second wavelength thereby making the photorefractive crystal photosensitive, the second wavelength being different from the first wavelength.

10. The optical storage system according to claim 7, wherein the object light beam and the reference light beam have a first polarization, and wherein the photorefractive crystal receives a gating light beam having a second polarization thereby making the photorefractive crystal photosensitive, the second polarization being different from the first polarization.

11. The optical storage system according to claim 1, wherein the optical storage medium has a longitudinal axis and a crystal face that is perpendicular to the longitudinal axis, and wherein the object light beam enters the optical storage medium through the crystal face that is perpendicular to the longitudinal axis.

12. The optical storage system according to claim 11, wherein the optical storage medium contains a plurality of storage locations located along the longitudinal axis of the optical storage medium.

13. The optical storage system according to claim 1, wherein the optical storage medium is a photorefractive polymer.

14. The optical storage system according to claim 1, wherein the optical storage medium is an organic read-write recording medium.

15. The optical storage system according to claim 14, wherein the organic read-write recording medium is bacteriorhodopsin.

16. The optical storage system according to claim 1, wherein the temporary buffer is part of the optical storage medium.

17. The optical storage system according to claim 1, wherein the temporary buffer is separate from the optical storage medium and is formed from a photorefractive crystal.

18. The optical storage system according to claim 17, wherein the photorefractive crystal is a LiNbO$_3$ crystal.

19. The optical storage system according to claim 17, wherein the temporary buffer is a photorefractive polymer.

20. The optical storage system according to claim 17, wherein the temporary buffer is an organic read-write recording medium.

21. The optical storage system according to claim 20, wherein the organic read-write recording medium is bacteriorhodopsin.

22. The optical storage system according to claim 1, wherein after the second hologram is recorded, the temporary buffer receives a voltage applied across the temporary buffer for erasing the first hologram.

23. The optical storage system according to claim 1, wherein the object light beam and the reference light beam have a first wavelength, and wherein after the second hologram is recorded, the temporary buffer receives a light beam having a second wavelength for erasing the first hologram, the second wavelength being different from the first wavelength.

24. The optical storage system according to claim 1, wherein the object light beam and the reference light beam have a first polarization, and where after the second hologram is recorded, the temporary buffer receives a light beam having a second polarization for erasing the first hologram, the second polarization being different from the first polarization.

25. The optical storage system according to claim 1, wherein the optical storage media is a rotating disk of optical storage media.

26. A method of recording a hologram, the method comprising steps of:

passing an object light beam through an optical storage medium;

recording a first hologram in a temporary buffer at an intersection of the object light beam and a first reference light beam;

reconstructing a phase-conjugate object light beam from the first hologram using a second reference light beam that is phase-conjugate to the first reference light beam;

recording a second hologram in the optical storage medium at an intersection of the phase-conjugate object light beam and a third reference light beam.

27. The method according to claim 26, wherein the first and second reference light beams are non-multiplexed reference light beams, the third reference light beam is a multiplexed reference light beam, and the optical storage medium contains a plurality of storage locations; and wherein the step of recording the second hologram records the second hologram at a selected storage location of the plurality of storage locations in the optical storage medium.

28. The method according to claim 26, wherein the step of reconstructing the phase-conjugate object light beam uses an output light beam from a self-pumped phase-conjugate mirror that is illuminated by the first reference light beam.

29. The method according to claim 26, wherein the step of reconstructing the phase-conjugate object light beam uses an output light beam from an externally-pumped phase-conjugate mirror that is illuminated by the first reference light beam.

30. The method according to claim 26, wherein the first and second reference light beams are counter-propagating.

31. The method according to claim 30, wherein one of the first and second reference light beams is a diverging beam and the other of the first and second reference light beams is a converging beam, and wherein the first and second reference light beams have a common focus point.

32. The method according to claim 26, wherein the optical storage media is formed from a photorefractive crystal.

33. The method according to claim 32, wherein the photorefractive crystal is a LiNbO$_3$ crystal.

34. The method according to claim 32, wherein the object light beam and the reference light beam have a first wavelength, the method further comprising the step of pre-exposing the photorefractive crystal using a gating light beam having a second wavelength thereby making the photorefractive crystal photosensitive, the second wavelength being different from the first wavelength.

35. The method according to claim 32, wherein the object light beam and the reference light beam have a first polarization, the method further comprising the step of pre-exposing the photorefractive crystal using a gating light beam having a second polarization thereby making the photorefractive crystal photosensitive, the second polarization being different from the first polarization.

36. The method according to claim 26, wherein the optical storage medium has a longitudinal axis and a crystal face that is perpendicular to the longitudinal axis, and wherein the object light beam enters the optical storage medium through the crystal face that is perpendicular to the longitudinal axis.

37. The method according to claim 36, wherein the optical storage medium contains a plurality of storage locations located along the longitudinal axis of the optical storage medium.

38. The method according to claim 26, wherein the optical storage medium is a photorefractive polymer.

39. The method according to claim 26, wherein the optical storage medium is an organic read-write recording medium.

40. The method according to claim 39, wherein the organic read-write recording medium is bacteriorhodopsin.

41. The method according to claim 26, wherein the temporary buffer is part of the optical storage medium.

42. The method according to claim 26, wherein the temporary buffer is separate from the optical storage medium and is formed from a photorefractive crystal.

43. The method according to claim 42, wherein the photorefractive crystal is a LiNbO$_3$ crystal.

44. The method according to claim 42, wherein the temporary buffer is a photorefractive polymer.

45. The method according to claim 42, wherein the temporary buffer is an organic read-write recording medium.

46. The method according to claim 42, wherein the organic read-write recording medium is bacteriorhodopsin.

47. The method according to claim 26, further comprising a step of erasing the first hologram after the step of recording the second hologram by applying a voltage across the temporary buffer.

48. The method according to claim 26, wherein the object light beam and the reference light beam have a first wavelength, the method further comprising a step of erasing the first hologram after the step of recording the second hologram by illuminating the first hologram using a light beam having a second wavelength, the second wavelength being different from the first wavelength.

49. The method according to claim 26, wherein the object light beam and the reference light beam have a first polarization, the method further comprising a step of erasing the first hologram after the step of recording the second hologram by illuminating the first hologram using a light beam having a second polarization, the second polarization being different from the first polarization.

50. The method according to claim 26, wherein the optical storage media is a rotating disk of optical storage media.

* * * * *